Aug. 25, 1959     H. BRANDT     2,900,795
RAISING AND LOWERING APPARATUS
Filed Oct. 20, 1955     2 Sheets-Sheet 1

INVENTOR
*HARRY BRANDT*
BY
ATTORNEYS

Aug. 25, 1959
H. BRANDT
2,900,795
RAISING AND LOWERING APPARATUS
Filed Oct. 20, 1955
2 Sheets-Sheet 2
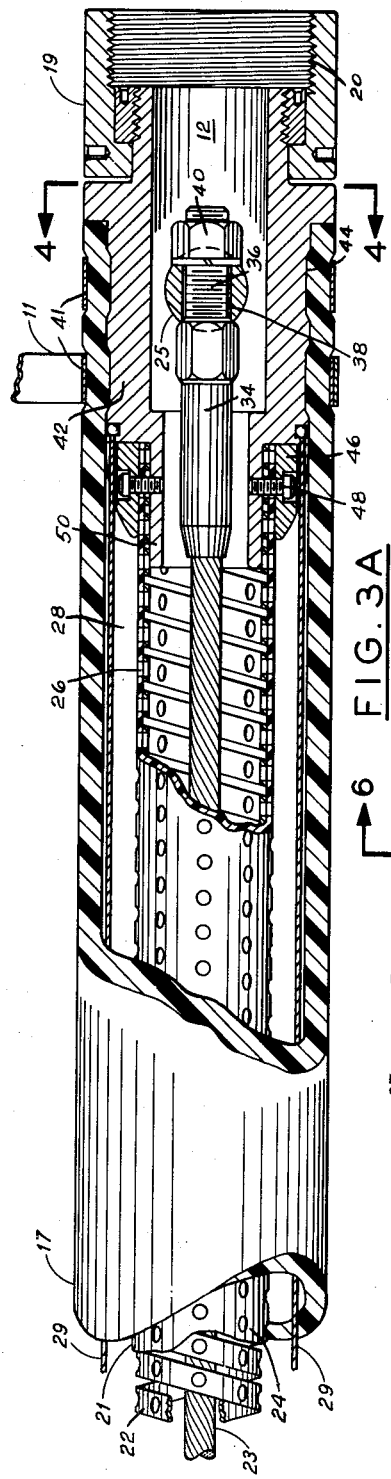
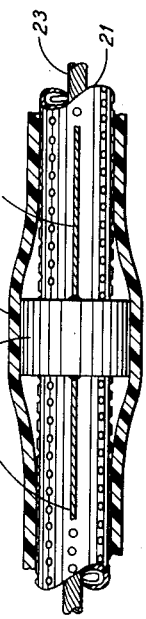
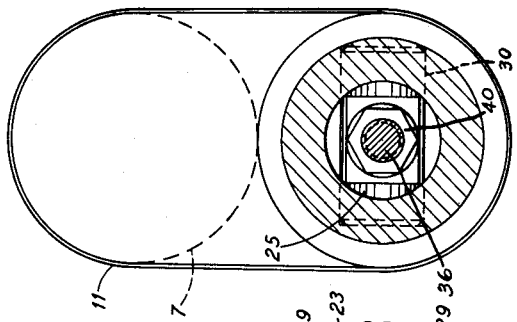
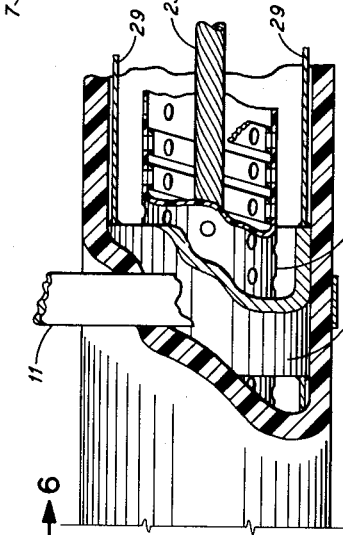
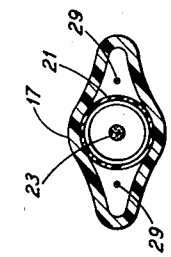
INVENTOR
HARRY BRANDT
BY
ATTORNEYS

United States Patent Office 2,900,795
Patented Aug. 25, 1959

2,900,795
RAISING AND LOWERING APPARATUS

Harry Brandt, Whittier, Calif., assignor to California Research Corporation, San Francisco, Calif., a corporation of Delaware Application October 20, 1955, Serial No. 541,716

1 Claim. (Cl. 61—72)

My invention relates to apparatus for raising and lowering an offshore seismic cable and particularly to an auxiliary cable the specific weight of which is varied from greater than that of water to less than that of water to control its position in the water.

According to the prior art of which I am aware, offshore seismic exploration has been performed through the use of seismic detector cables which are either laid on the bottom of the ocean or are floated in the water at or near the surface. A floating cable is found to be convenient to use in some operations. Such a cable however, may be lacking in sensitivity if the seismic detectors in the cable are pressure sensitive ones.

I have found that in some areas where the water is shallow, it is desirable that the seismic detectors be placed as low in the water as possible, specifically, on the bottom of the ocean. If the seismic cable is laid on the bottom, the operator ordinarily moves the cable for successive seismic shots by dragging the cable along the bottom. Such dragging of the cable causes abrasion of its outer surfaces and at times damages the cable elements. The problem of damage to the cable is particularly severe in areas of coral or rock bottoms. The sharp coral tends to snag the cable and cause appreciable delay and consequently expense.

To solve these problems, I have provided a seismic cable which may be lowered to the bottom or floated to the surface at the will of the operator. Such an arrangement permits the cable to record the seismic waves from a position on the bottom, then to be raised in the water before it is moved to another location. Thus, the cable affords the benefits of recording the seismic energy at the bottom and avoids the damage to the cable which would result from dragging it along the bottom as it is moved to a new location.

Briefly stated, my invention involves the use of an auxiliary cable of controllable buoyancy to control the elevation in the water of a neutrally buoyant seismic detector cable. An auxiliary cable is attached to the neutrally buoyant seismic detector cable along its entire length. A gas or light liquid is pumped from the boat into the auxiliary cable to increase the volume of the auxiliary cable, thereby decreasing the specific weight of the auxiliary cable. The auxiliary cable then becomes buoyant, rising to the surface along with the neutrally buoyant seismic detector cable. The gas within the auxiliary cable may then be exhausted into a storage tank, allowing the auxiliary cable to contract, increasing its specific weight and causing it to sink to the bottom and to force the neutrally buoyant cable to the bottom.

The novel features of my invention are set forth with more particularity in the accompanying claim. The invention itself, however with respect to the details thereof, together with its additional objects and advantages may be better understood from the following description of specific embodiments with reference to the accompanying drawings in which:

Figs. 3A and 3B show a cutaway section of an auxiliary cable according to my invention;

Fig. 4 shows a sectional view through an auxiliary cable; and

Figs. 5 and 6 show views of the auxiliary cable from which the gas has been exhausted.

Figure 1:
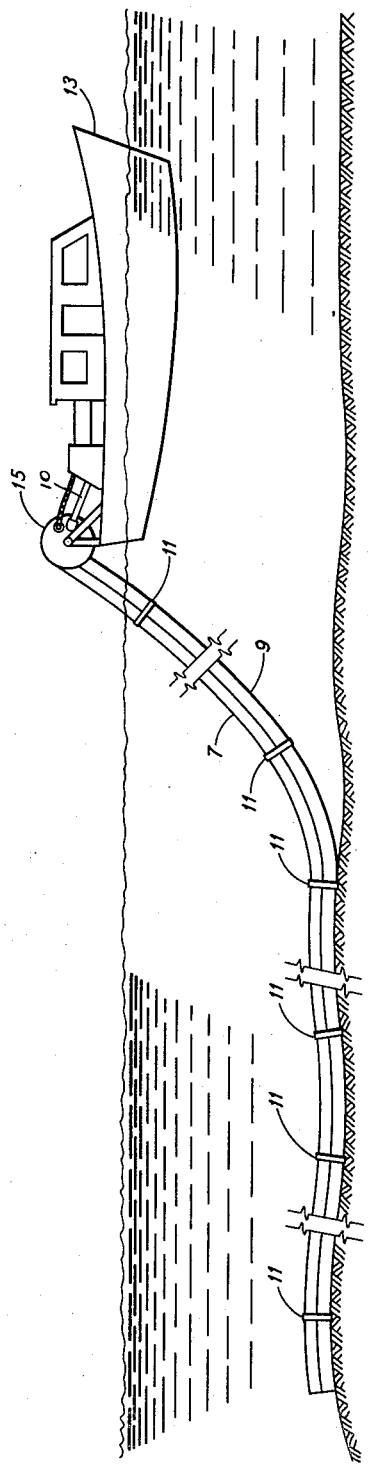
Fig. 1 shows schematically seismic cables according to my invention in position for use.

As shown in Fig. 1, a neutrally buoyant seismic cable 7 is attached to an auxiliary cable 9 by means of bands 11. A seismic recording boat 13 has a reel 15 over which the seismic cable 7 and auxiliary cable 9 are played out. The seismic cable 7 contains conductors for signals from its detectors. These conductors are connected to record the seismic signals on the boat 13. Strength members in both the seismic cable 11 and the auxiliary cable 9 are affixed to the reel 15 to permit the cables to be towed through the water without damage. The auxiliary cable 9 is connected to a pneumatic line 10 on the recording boat 13 and the pneumatic line 10 may be placed in communication with pressure tank 35 or storage tank 32 by manipulation of the appropriate valves 37 and 31 connected respectively thereto.

The details of the auxiliary cable are shown in Figs. 3A, 3B and 4. The auxiliary cable may be in 50 foot lengths. On the outside of this cable is a heavy durable cover 17 which extends between two end connectors 19 each one of which is affixed to a respective end of an auxiliary cable section. The end connectors 19 are threaded so that successive auxiliary cable sections may be screwed together to form a cable several hundred feet in length. One end connector contains a female thread 20 which receives a male thread on a successively connected cable section to join the sections together in a manner familiar to the art. Each of the end connectors 19 has a conduit 12 formed axially through it so that when complementary connectors are joined together the respective conduits form a communicating passage between cable sections. At the center of each cable section is a length of perforated crush-resistant conduit 21. This conduit may be formed of a metal strip 22 wound helically to produce a tubular member which then is covered with a flexible material 24, such as rubber, neoprene or the like. Radially disposed, longitudinally spaced openings 26 are formed through the walls of the conduit 21 to provide communication between the interior of the conduit and the chamber 28 within the cover 17. The conduit 21 is resistant to radial forces but is sufficiently flexible to permit bending of the cable sections. It maintains an open channel through the entire length of the cable for the passage of a light fluid or gas. The strength member 23 passes axially through the cable between the respective end connectors 19 to which it is secured. The member 23 provides longitudinal tensile strength for the cable. Each end of the strength member 23 is attached to a peg 25 which is mounted diametrically of the longitudinal axis of the cable section in a hole 30 formed transversely through the end connector 19. This attachment is made through fastening elements 34 which are securely affixed to each end of the member 23 and which have a screw-threaded end portion 36 of reduced diameter passing through a hole 38 in the peg 25 in alignment with the axis of the cable section. A nut 40 screwed on the portion 36 secures the fastening element 34 to the peg 25 and hence secures the strength member 23 to the end connector 19.

The cover 17 is secured at each end to a respective end connector 19 by means of clamping bands 41 which clamp the cover to an axially inwardly directed sleeve portion 42 of the end connector. The portion 42 has circumferential corrugations 44 formed on its exterior surface, and the bands 41 are applied to the cover with sufficient force to cause it to be deformed into these corrugations to produce a fluid-tight seal between the cover and the end connector.

Each end of the conduit 21 is secured to a respective end connector 19 by a clamping element 46 and radially directed bolts 48. The bolts pass through appropriate openings in the clamping elements and engage screw-threaded holes formed in an axially inwardly directed sleeve portion 50 of reduced diameter formed on the connector 19. The end portion of the conduit 21 is mounted on the radially outer circumference of the sleeve 50 and has holes formed in it in alignment with those in the sleeve. Thus when the parts are assembled the bolts 48 and the clamping elements 46 cooperate with the sleeve portion 50 to secure the ends of the conduit to the respective end connectors.

The bands 11 which attach the auxiliary cable 9 to the neutrally buoyant seismic cable 7 are under tension and therefore exert a compressing force on the auxiliary cable 9. In order to provide support for the bands 11, internal bands 27 are placed under the cover 17 at the places where the bands 11 are to be placed. The bands 27 are secured from longitudinal movement within the cable by positioning members 29.

Figure 2:
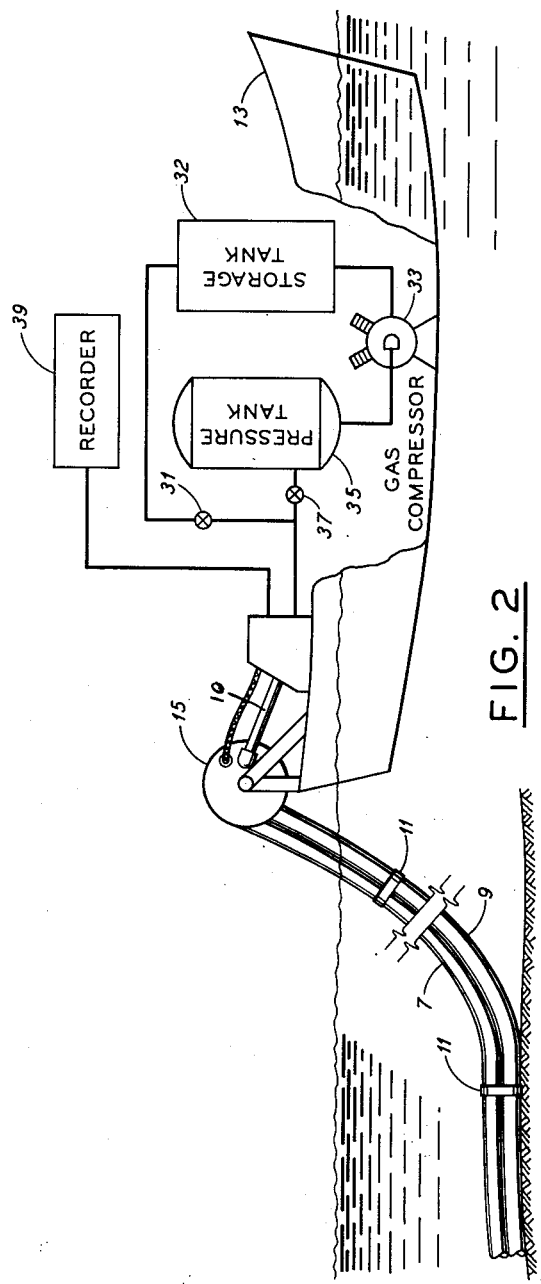
Fig. 2 shows schematically the arrangement of pump and associated equipment for controlling the specific weight of the auxiliary cable.

The operation of the seismic cables may be described with reference to Fig. 2. When the valve 31 is open the hydrostatic pressure from sea water collapses the auxiliary cable 9 to its minimum volume by forcing the gas within the cable through the interconnected pneumatic line 10 and into the storage tank 32. The specific weight of the cables is then greater than the specific weight of water and the cables will sink to the bottom. The valve 31 is then closed. The gas compressor 33 is actuated to compress the gas in the pressure tank 35. When it is desired to raise the cables 9 and 11, a valve 37 is opened while the compressor is operating, permitting gas under pressure to flow through the interconnected pneumatic line 10 and into the cable 9 and the air pressure within the cable 9 is raised sufficiently to cause the cable to take on a circular cross section as illustrated in Figs. 3A and 3B. The structural elements in the auxiliary cable 9 have been selected to have such a weight that the cable 9 is buoyant when it assumes a circular cross section. The seismic cable 7 is neutrally buoyant and therefore can be raised to the surface by the buoyant cable 9 which is constructed to have sufficient positive buoyancy for this purpose.

The recording boat 13 moves to a new recording location by towing the cables through the water and it is then desired to lower the cables to the bottom. The valve 37 is closed, the valve 31 is opened and the gas within the auxiliary cable is exhausted through the interconnected pneumatic line 10' into the storage tank 32. The auxiliary cable 9 assumes a shape such as that shown schematically in Figs. 5 and 6. The cable maintains a circular cross section around the internal bands 27 but otherwise collapses around the conduit 21 to assume an irregular oblong cross section. The volume of the cable is then much smaller than it is when the cable has a circular cross section and the specific weight of the cable increases accordingly. The auxiliary cable then has a specific weight greater than that of sea water and sinks to the ocean bottom dragging the neutrally buoyant cable downward with it. Another seismic shot is then detected in the cable 7 and recorded in the recorder 39.

It is apparent from the above that I have provided a means for raising and lowering a seismic cable while maintaining it in a substantially horizontal position in the water in order to permit the cable to be moved between seismic recording locations. The operation of auxiliary cable 9 is dependent upon its change in specific weight under the action of gas pressure within the cable. Other low-density fluids would be equally useful to vary the specific weight of the cable if the weight of the cable were properly adjusted according to the fluid used. In the event that a light liquid is used within the auxiliary cable, the compressor 33 will be a liquid compressor and the pressure tank 35 contains a small amount of gas which fills the upper part of the tank 35 and is compressed by the liquid forced into the pressure tank 35.

While I have explained my invention with reference to a specific embodiment thereof, I am aware that many modifications of it can be made without departing from my teachings. I do not intend, therefore, to limit my invention except as set forth in the appended claim.

I claim:

A device for controlling the vertical position of a seismic detector cable in a body of water comprising an auxiliary cable attached to and parallel with said seismic cable and having a length substantially coextensive with said seismic cable, said auxiliary cable being formed with a flexible water-impervious radially extensible outer covering the inner walls of which form a collapsible fluid-tight chamber in said auxiliary cable, a radially rigid and axially flexible conduit within said covering and radially separable from the inner walls thereof, radially disposed longitudinally spaced openings in the walls of said conduit to establish communication between the interior of said conduit and said chamber throughout the length of said auxiliary cable, means to introduce a fluid under pressure into one end of said conduit to radially extend the walls of said outer covering uniformly throughout the length of said auxiliary cable, and means to release the said fluid from said auxiliary cable through the said one end of said conduit to cause the walls of said outer covering to collapse onto said flexible conduit.

References Cited in the file of this patent

UNITED STATES PATENTS

| | | |
|---|---|---|
| 2,391,059 | MacFarren | Dec. 18, 1945 |
| 2,668,512 | Klas | Feb. 9, 1954 |
| 2,751,703 | Kietz et al. | June 26, 1956 |
| 2,791,757 | Blake et al. | May 7, 1957 |

FOREIGN PATENTS

| | | |
|---|---|---|
| 1,270 | Great Britain | 1857 |
| 1,049,909 | France | Oct. 26, 1953 |